United States Patent [19]

Love et al.

[11] 3,862,185

[45] Jan. 21, 1975

[54] PREPARATION OF AMIDES

[75] Inventors: Richard F. Love, Fishkill; John M. Larkin, Wappingers Falls, both of N.Y.

[73] Assignee: Texaco Inc., New York, N.Y.

[22] Filed: Mar. 8, 1973

[21] Appl. No.: 339,238

[52] U.S. Cl.................. 260/293.77; 260/293.86, 260/404, 260/404.5, 260/561 R, 260/562 R, 260/558 R
[51] Int. Cl............................................ C07d 87/34
[58] Field of Search... 260/247.7 H, 293.77, 293.86, 260/404, 404.5, 561 R, 558 R, 562 R

[56] References Cited
UNITED STATES PATENTS 3,746,729   7/1973   Lachowicz...................... 260/404.5

*Primary Examiner*—G. Thomas Todd
*Attorney, Agent, or Firm*—T. H. Whaley; C. G. Ries

[57] ABSTRACT

A method for preparing amides by reacting a vicinal nitroketone with ammonia, a primary amine or a secondary amine at a temperature of from about 60° to about 130°C. The amides so prepared are useful as foam stabilizers, waterproofing agents, rust inhibitors, fuel oil additives, antistatic compounds, viscosity controllers, cosmetic components and high-temperature solvents.

30 Claims, No Drawings

PREPARATION OF AMIDES

BACKGROUND OF THE INVENTION

This invention relates to a novel method of preparing amides from nitroketones. In particular, it relates to a method for preparing amides by reacting vicinal nitroketones to produce amides.

Heretofore many amides were not generally available at low cost. For example, such amides as 12-nitrododecanamide, N-(6-nitrohexanoyl) morpholine, N-heptadecanoylpiperidine, pentadecanoamide and heptadecanoamide were not readily available from the natural sources and their manufacture from relatively expensive initial reactants was required. Prior means of producing amides included reaction of the methyl ester of organic acids with amines, reaction of organic acids with amines or reaction of organic acid chlorides with amines.

In the reactions outlined above there can result serious disadvantages in that reactions involving acids or esters and amines are equilibrium processes frequently requiring high temperatures and pressures to drive the reactions to completion. In addition, the organic acid itself is often not available and acid chlorides of high molecular weight fatty acids and substituted fatty acids are difficult to prepare and purify. Further, the product obtained by such prior methods contained impurities such as unreacted ester or acid which were difficult to remove thereby requiring costly purifying steps which detracted from the commerical attractiveness of the process.

It is therefore an object of this invention to provide a method for the preparation of amides from vicinal nitroketones.

It is another object of this invention to provide a method for the preparation of amides from vicinal nitroketones wherein the products can be easily recovered in high yields.

Yet another object of this invention is to provide a method for preparing amides whereby undesirable by-product formation is minimized.

Other objects and advantages will become apparent from reading of the following detailed description and examples.

SUMMARY OF THE INVENTION

Broadly this invention contemplates a method for the preparation of amides which comprises reacting a vicinal nitroketone with a member selected from the group consisting of ammonia, primary amines and secondary amines at a temperature of from about 60° to 130°C.

According to our invention the vicinal nitroketones reacted in the instant method correspond to the formula:

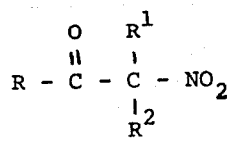

where R is an alkyl group having from 1 to 20 carbon atoms or an aryl group of from 6 to 20 carbon atoms and where $R^1$ and $R^2$ are hydrogen, alkyl groups having from 1 to 20 carbon atoms or aryl groups of from 6 to 20 carbon atoms. A combination of groups may be present as, for example, R can be alkyl and $R^1$ and $R^2$ hydrogen or R and $R^1$ may be aryl and $R^2$ hydrogen or R may be alkyl, $R^1$ hydrogen and $R^2$ aryl. Moreover, R and $R^2$ may together form a polymethylene radical of from 1 to 22 carbons thereby providing a cyclic nitroketone which is also contemplated as a reactant. Preferably, the material reacted according to the instant method is a vicinal nitroketone where $R^1$ is hydrogen and R and $R^2$ are alkyl groups of 1 to 20 carbons.

Illustrative of the vicinal nitroketones contemplated herein can be mentioned: 1-nitro-2-butanone, 3-nitro-2-butanone, 3-methyl-3-nitro-2-butanone, 2-nitro-3-pentanone, 1-nitro-2-pentanone, 3-nitro-2-pentantone, 1-nitro-2-hexanone, 3-nitro-2-hexanone, 4-nitro-3-hexanone, 1-nitro-2-heptanone, 3-nitro-4-heptanone, 5-nitro-4-octanone, 1-nitro-2-decanone, 4-nitro-5-decanone, 5-nitro-4-dodecanone, 1-nitro-1-phenylpropanone, alpha-nitrobenzylphenylketone, 1,4-diphenyl-3-nitro-2-butanone, 3-nitro-4-pentadecanone, 1-nitro-2-hexadecanone, 9-nitro-8-heptadecanone, 8-nitro-9-heptadecanone, 1-nitro-2-octadecanone, 1-nitro-2-nonadecanone, 5-nitro-6-eicosanone, 1-nitro-2-heneicosanone, 2-nitrocyclopentanone, 2-nitrocyclohexanone, 2-nitro-3-methylcyclopentanone, 2-nitrocyclooctanone, 2-nitrocyclododecanone, 2-nitro-4-pentylcyclotetradecanone, and 2-nitrocyclooctadecanone.

More specifically, the method of this invention comprises reacting under the conditions specified a vicinal nitroketone as hereinabove recited with a member of the group ammonia, primary amines or secondary amines. Vicinal nitroketones are generally considered weak acids and react with ammonia, primary and secondary amines at ambient temperatures to yield polar complexes or salts. It has now been found that the instant method employing the ratios of reactants and conditions detailed below cause the nitroketone to undergo an alternate reaction leading to the formation of amides.

The members contemplated in the instant invention correspond to the formula:

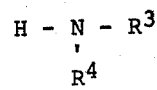

where $R^3$ and $R^4$ are hydrogen, alkyl, cycloalkyl or aryl groups or where $R^3$ and $R^4$ together with the nitrogen (N) are heterocyclic. When $R^3$ and $R^4$ are other than hydrogen, the group contains from 1 to 12, preferably 1 to 6, carbons and the sum of $R^3$ and $R^4$ is from 2 to 24 carbons. Illustrative of the primary and secondary amines operative in the instant method we mention methylamine, ethylamine, butylamine, diethylamine, ethylpropylamine, ethylbenzylamine, aniline, piperidine, morpholine, benzylmethylamine, ethylene diamine, ethanolamine and pyrollidine. In general, any primary or secondary amine having a $pk_b$ of less than 10 (ionization constant in water $k_i$ greater than $1 \times 10^{-10}$), preferably a $pk_b$ less than 7 ($k_i$ greater than $1 \times 10^{-7}$), can be employed. Preferred compounds are ammonia, n-butylamine, piperidine and morpholine.

In practice, the vicinal nitroketone is contacted with ammonia, a primary amine or a secondary amine in amounts ranging from about 1.0 to 200, preferably from 1.1 to 10 moles of ammonia, primary or secondary amine per mole of vicinal nitroketone. Lesser amounts of ammonia or amine result in slow rates of reaction or incomplete conversion such that the primary product comprises an amine-nitroketone salt or complex. Moreover, contacting is conducted at a temperature of from about 60° to 130°C., preferably 80° to 100°C. Temperatures below 60°C. are undesirable in that such temperatures are also conducive to the formation of complexes or salts of the amine and nitroketone whereas temperatures exceeding 130°C. should be avoided in that they induce side reactions, particularly those which lead to the destruction and loss of the nitroalkane coproduct. The reaction time is normally between about ½ to 15 hours although longer and shorter periods may be employed, depending upon the reaction temperature and the base strength ($pk_b$) of the amine. In a highly preferred embodiment, 1.5 to 2 moles of ammonia or amine are added per mole of vicinal nitroketone.

When primary or secondary amines having aqueous ionization constants less than $1 \times 10^{-7}$ are used, the reaction time can be reduced and the weight percent yield of amide increased by introducing to the reaction a strong organic base having a $pk_b$ of 4.0 or less such as a tertiary amine or a quaternary ammonium hydroxide. Illustrative of the strong organic bases we mention tetramethylguanidine, triethylamine, benzyltrimethylammonium hydroxide, tetramethylhydrazine, trimethylamine, N-methylpiperidine, tri-n-butylamine and N-methylpyrrolidine. The strong organic base can be employed in amounts of from about 0.01 to 1, preferably 0.1 to 1 mole of base per mole of ammonia, primary or secondary amine.

The amides prepared according to the instant method in general correspond to the formula:

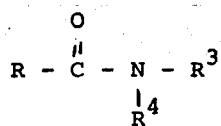

where R, $R^3$ and $R^4$ are as heretofore defined. In those instances where a cyclic nitroketone is contemplated for reaction, the product is an omega-nitroamide, the nitro group being present on the terminal carbon of R. Specifically, examples of amides prepared by the instant method include by way of example N-heptadecanoylpiperidine, N-butylheptadecanamide, heptadecanamide, N-pentadecanoylmorpholine, nonamamide, N,N-diethylnonanamide, pentadecanamide, N-benzoylmorpholine, nonanoylanilide, 5-nitropentanamide, 6-nitrohexanamide, 8-nitrooctanamide and 12-nitrododecanamide. The amides are useful as foam stabilizers, waterproofing agents, rust inhibitors, fuel additives, antistatic compounds, viscosity controllers, cosmetic components and high temperature solvents.

The reaction outlined above involving reaction of a vicinal nitroketone with ammonia, a primary or secondary amine additionally forms as a coproduct, when other than cyclic nitroketones are employed, a nitroalkane corresponding to the formula:

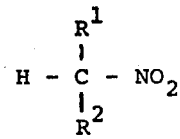

where $R^1$ and $R^2$ are groups heretofore defined. Examples of nitroalkanes so prepared include nitromethane, nitroethane, 1-nitrobutane, 1-nitrooctane and 1-nitro-2-phenylethane.

In a preferred aspect of this invention, the contacting of the vicinal nitroketone and ammonia, primary amine or secondary amine is conducted in the presence of a solvent not adversely affecting the reaction. Aqueous and non-aqueous solvents can be satisfactorily employed and excess amine can function as the reaction medium. The reaction is conveniently undertaken in the presence of such added diluents as benzene, xylene, cyclohexane, diethylether, n-octane, dioxane, tetrahydrofuran, isooctane, water and alcohols such as methanol, ethanol, isopropanol and t-butanol. When hydroxylic diluents (water, alcohol) are used large excesses of ammonia or amine to nitroketone (100:1 and greater) should be employed to limit carboxylic acid or ester formation and insure a good yield of amide. Preferably the solvent employed is a non-reactive liquid hydrocarbon having a boiling point of about 60° to 130°C. under the conditions of the instant method. Preferred diluents are benzene, toluene, and isooctane. In those instances where a nitroalkane is formed and recovery of the same is contemplated, diluents such as ethers, alcohols and water are not preferred as they markedly reduce the yields of this coproduct.

At the completion of the reaction the product comprises a mixture of the formed amide and nitroalkane, unreacted nitroketone, ammonia or amine, and diluent, if employed. To recover the amide the reaction mixture can be initially heated and the diluent and nitroalkane recovered as a distillate. Any unconverted nitroketone can be recovered by fractional crystallization, chromatography or in the case of the lower molecular weight nitroketones by extraction with aqueous alkali or isolation as the ammonia salt. The ammonia or amine employed in excess of stoichiometry remaining at the completion of the reaction can be easily recovered by fractional distillation or by isolation as the water soluble hydrochloride salt. Very high purity amides can be obtained by vacuum distillation, crystallization or chromatography.

In order to more fully illustrate the nature of the invention and the manner of practice of the same, the following examples are presented.

EXAMPLE I

A solution containing 7.8 grams (24.9 mmoles) of 1-nitro-2-octadecanone and 4.28 grams (50 mmoles) of piperidine in 150 milliliters of dry benzene was heated to a temperature of 81°C. for 0.5 hour and the benzene slowly distilled off over a period of one hour. The distillate (73.2 grams) was analyzed by quantitative infrared spectral analysis and was found to contain 1.58 grams of nitromethane corresponding to a 103 weight percent yield. The distillation residue was stripped of remaining benzene and infrared spectral analysis of the residue (13.9 grams) showed it to be a mixture of amide and piperidine. Recrystallization of the residue from methanol provided 7.4 grams (88.4 weight percent yield) of N-heptadecanoylpiperidine having a melting point of 37°–38°C.

EXAMPLE II

A solution of 1-nitro-2-octadecanone (7.8 grams, 24.9 mmoles) and morpholine (4.35 grams, 50 mmoles) in 200 milliliters of dry benzene was refluxed for 30 minutes followed by slow distillation of a portion of the solvent. The distillate was found to contain nitromethane (1.26 grams, 83 weight percent yield) basis infrared analysis. The undistilled portion was stripped of solvent and the residue recrystallized from methanol thereby providing 6.7 grams (84.5 weight percent yield) of N-heptadecanoylmorpholine having a melting point of 53°–54°C.

EXAMPLE III

A solution of 1-nitro-2-octadecanone (3.1 grams, 9.9 mmoles) and n-butylamine (1.46 grams, 20 mmoles) in 75 milliliters of dry benzene was refluxed for 30 minutes followed by slow distillation of 50 milliliters of the solvent. The distillate basis infrared analysis was found to contain 0.522 grams (85.6 weight percent yield) of nitromethane. The remaining solvent was stripped from the residue under reduced pressure and 3.2 grams (98 weight percent yield) of N-butylheptadecanamide having a melting point of 72°–75°C. was recovered.

EXAMPLE IV

Dry, gaseous ammonia (2.0 grams, 117 mmoles) was condensed in a heavy walled glass vessel containing 1-nitro-2-octadecanone (3.1 grams, 9.9 mmoles) and 25 milliliters of xylene by cooling to -80°C. The vessel was then purged with nitrogen, sealed and heated to 100°C for 90 minutes. Upon cooling to ambient temperature the contents were diluted with 100 milliliters of benzene and the benzene thereafter distilled off at atmospheric pressure at 80°–82°C. By infrared analysis the distillate was found to contain 0.33 gram (54.8 weight percent yield) of nitromethane. The distillate residue after stripping of the remaining diluent and recrystallation from chloroform yielded 2.31 grams (86 weight percent) of heptadecanamide having a melting point of 102°–104°C.

EXAMPLE V 1 nitro-2-octadecanone (1.0 gram, 3.2 mmoles) was added to 20 milliliteres of concentrated (28–30%, 300 mmoles) aqueous ammonium hydroxide and the mixture refluxed for 4 hours at 100°C. After cooling to 20°C., the mixture was diluted with 100 milliliters of water and thereafter filtered. There was collected 0.77 gram (89 weight percent yield) of crude heptadecanamide having a melting point of 99°–103°C.

A reaction vessel maintained at -40°C. was charged with 30 milliliters of liquid ammonia (1.1 moles) and 3.08 grams (9.8 mmoles) of 1-nitro-2-octadecanone and the mixture stirred for 30 minutes. The mixture was thereafter permitted to warm to ambient temperature and the ammonia removed by evaporation. The residue (3.1 grams) was identified as the crude ammonium salt of the nitroketone having a melting point 89°–90°C.

A mixture of 1-nitro-2-octadecanone (1.0 gram, 3.2 mmoles) and 15 milliliters of a concentrated ammonium hydroxide solution (28–30 weight percent ammonia, 230 mmoles) was allowed to stand at ambient temperature for a period of 20 hours. Following the addition of 15 milliliters of water and upon filtering the mixture, 1.0 gram of a solid was collected and identified by its infrared spectrum to be crude ammonium salt of the nitroketone having a melting point of 92°–93°C.

EXAMPLE VI

A blend of 1-nitro-2-hexadecanone (2.85 grams, 10 mmoles), morpholine (1.75 grams, 20 mmoles) and 100 milliliters of benzene was refluxed for 30 minutes at 80°C. A portion of the benzene (46.2 grams) was distilled off at atmospheric pressure. Infrared analysis of the distillate showed it to contain 0.46 grams (75 weight percent yield) of nitromethane. The residue was stripped under vacumm and 3.0 grams (96.4 weight percent yield) of N-pentadecanoylmorpholine having a melting point of 42°–43°C. was recovered.

EXAMPLE VII

A solution of 1-nitro-2-decanone (2.0 grams, 10 mmoles) and diethylamine (2.0 grams, 27 mmoles) was heated in 25 milliliters of xylene at 110°C. for 2 hours in a sealed glass tube under autogenous pressure. Upon cooling, the solution was diluted with 100 milliliters of benzene and the solvent thereafter removed by atmospheric pressure distillation. The distillate was found to contain 0.315 gram (52 weight percent yield) of nitromethane. After stripping the residue of xylene under vacuum distillation, 1.63 grams (76 weight percent yield) of N,N-diethylnonanamide having a boiling point of 144°–147°C./5 mm. was recovered.

EXAMPLE VIII

A solution of 1-nitro-2-decanone (20.1 grams, 100 mmoles) in 50 milliliters of benzene was placed in a rocker bomb and charged with 34 grams (2.0 mmoles) of ammonia under an initial pressure of 100 psig. The pressure vessel was heated to 110°C. under 575 psig for 2 hours. The material recovered was found to contain 4.26 grams (70 weight percent yield) of nitromethane. After stripping of volatiles from the residue and recrystallizing from isooctane there was recovered 11.42 grams (72.7 weight percent yield) of nonanamide having a melting point of 88°–92°C.

EXAMPLE IX

A solution of 1-nitro-2-decanone (5.0 grams, 24.8 mmoles) in 50 milliliters of diethylether was saturated with dry ammonia (0.5 gram, 30 mmoles) at a temperature of 0°C. The precipitate which formed was collected, dried and there was recovered 3.7 grams (68 weight percent yield) of material identified as the ammonium salt of the nitroketone having a melting point of 82°–84°C.

A solution of 1-nitro-2-decanone (5.0 gram, 24.8 mmoles) in 50 milliliters of diethylether was contacted with morpholine (2.2 grams, 25.4 mmoles) at a temperature of 0°C. for 0.5 hours. The precipitate which formed was collected by filtration and there was recovered 6.4 grams (89 weight percent yield) of the morpholine salt of the nitroketone having a melting point of 92°–93°C.

EXAMPLE X

A mixture of 1-nitro-2-hexadecanone (5.7 grams, 20 mmoles) and 100 milliliters of concentrated (28–30%) aqueous ammonia (90 grams, 1.5 moles) was refluxed for 4 hours at 100°C. After diluting the mixture with 300 milliliters of water and filtering, the residue was recrystallized from chloroform and isopropanol and there was recovered 4.2 grams (87 weight percent yield) of pentadecanamide having a melting point of 96°–102°C.

A solution of 1-nitro-2-hexadecanone (5.7 grams, 20 mmoles) in 100 milliliters of dry isopropanol was saturated with ammonia gas (6 grams, 300 mmoles) and heated for 4 hours at 80°C. After cooling, the diluent was stripped at a reduced pressure of 20 mm. employing a rotary evaporator, the residue recrystallized from isopropanol and there was recovered 4.06 grams (84 weight percent yield) of pentadecanamide having a melting point of 97°–100°C.

EXAMPLE XI

A solution of alpha-nitroacetophenone (1.65 grams, 10 mmoles), morpholine (1.74 grams, 20 mmoles) in a total of 175 milliliters of benzene was refluxed for 5 hours at 80°C. Infrared analysis of distillate samples gave a yield of 0.186 grams (30 weight percent yield) of nitromethane. The distillation residue was stripped of benzene under reduced pressure and infrared spectral analysis of the residue (2.55 grams) showed it to be a mixture of morpholine salt of alpha-nitroacetophenone and N-benzoylmorpholine.

A solution of alpha-nitroacetophenone (1.65 grams, 10 mmoles), morpholine (1.75 grams, 20 mmoles), tetramethylguanadine (0.10 gram, 0.87 mmoles) in 75 milliliters of benzene was refluxed for 3 hours at 80°C. A 47 milliliter portion of the benzene was stripped off at atmospheric pressure, collected and found to contain 0.13 grams (21 weight percent yield) of nitromethane. The residual solution after cooling to 10°C. provided a precipitate (0.8 gram, 42 weight percent yield) identified as N-benzoylmorpholine having a melting point of 72°–74°C.

EXAMPLE XII

A solution of 1-nitro-2-decanone (2.0 grams, 10 mmoles), aniline (1.8 grams, 19,3 mmoles and tetramethylguanidine (0.5 grams, 4.3 mmoles) in 50 milliliters of benzene was refluxed for about 15 hours at 81°C. A 30 milliliter portion of benzene was distilled off and found to contain 0.35 gram (57 weight percent yield) of nitromethane. After stripping the remaining benzene under reduced pressure, an infrared spectral analysis of the residue showed it to consist of a mixture of aniline, starting nitroketone and nonanoylanilide.

The above experiment was repeated under the same conditions except in the absence of tetramethylguanidine. 35 weight percent yield of nitromethane was recovered along with a lower yield of nonanoylanilide.

EXAMPLE XIII

A blend of 2-nitrocyclohexanone (1.43 grams, 10 mmoles), ammonia (1.0 gram, 59 mmoles) and 40 milliliters of benzene contained in a sealed heavy walled glass tube was heated to 93°C. for 2 hours. After stripping the solvent from the mixture, the residue weighing 1.5 grams basis infrared and spectroscopic analysis consisted of 70 weight percent 6-nitrohexanamide and 30 weight percent 2-nitrocyclohexanone.

EXAMPLE XIV

A mixture of 2nitrocyclododecanone (2.27 grams, 10 mmoles) and 100 milliliters of 0.35N aqueous ammonium hydroxide (35 mmoles, $NH_3$) was heated for two hours at 60°F. The aqueous mixture was then evaporated to dryness to afford 2.61 grams (99% yield) of the ammonium salt of 12-nitrododecanoic acid, m.p. 105°C.

A mixture of 2-nitrocyclododecanone (2.3 grams, 10.1 mmoles) and 50 milliliters of concentrated (30%) aqueous ammonium hydroxide (0.75 moles, $NH_3$) was heated for 2 hours at 70°C. The mixture was cooled, reduced in volume to 25 milliliters under reduced pressure (13 mm.), filtered and 2.05 grams (83% yield) of 12-nitrododecanamide, m.p. 110°–112°C., collected.

We claim:

1. A method for the preparation of amides which comprises contacting a vicinal nitroketone corresponding to the formula:

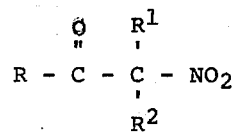

where R is an alkyl group having from 1 to 20 carbon atoms or an aryl group of from 6 to 20 carbon atoms, where $R^1$ and $R^2$ are hydrogen, alkyl groups having from 1 to 20 carbon atoms or aryl groups of from 6 to 20 carbon atoms or where R and $R^2$ together form a polymethylene radical of from 1 to 22 carbons with a member selected from the group consisting of ammonia, primary amines and secondary amines corresponding to the formula:

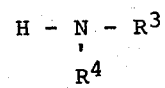

where $R^3$ and $R^4$ are hydrogen, alkyl, cycloalkyl or aryl groups of from 1 to 12 carbons or where $R^3$ and $R^4$ together with N are heterocyclic at a temperature of from about 60° to 130°C., wherein from 1 to 200 moles of said member are contacted per mole of said nitroketone.

2. A method according to claim 1 wherein said temperature is from about 80° to 100°C.

3. A method according to claim 1 wherein from 1.1 to 10 moles of said member are contacted per mole of nitroketone.

4. A method according to claim 1 wherein from 1.5 to 2.0 moles of said member are contacted per mole of nitroketone.

5. A method according to claim 1 wherein said contacting is undertaken in the presence of from about 0.01 to 1 mole of a strong organic base per mole of said member.

6. A method according to claim 1 wherein said contacting is undertaken in the presence of from 0.1 to 1 mole of a strong organic base per mole of said member.

7. A method according to claim 5 wherein said strong organic base is tetramethylguanidine, 8. A method according to claim 6 wherein said strong organic base is triethylamine.

9. A method according to claim 5 wherein said strong organic base is trimethylamine.

10. A method according to claim 5 wherein said strong organic base is N-methylpiperidine.

11. A method according to claim 5 wherein said strong organic base is tri-n-butylamine.

12. A method according to claim 1 wherein said member is ammonia.

13. A method according to claim 1 wherein said member is a primary amine.

14. A method according to claim 1 wherein said primary amine is n-butylamine.

15. A method according to claim 1 wherein said member is a secondary amine.

16. A method according to claim 1 wherein said secondary amine is piperidine.

17. A method according to claim 1 wherein said secondary amine is morpholine.

18. A method according to claim 1 wherein said secondary amine is diethylamine.

19. A method according to claim 1 wherein said contacting is undertaken in the presence of a diluent having a boiling point of about 60° to 130°C.

20. A method according to claim 1 wherein said nitroketone is 2-nitrocyclohexanone.

21. A method according to claim 1 wherein said nitroketone is 2-nitrocyclododecanone.

22. A method according to claim 1 wherein said nitroketone is 1-nitro-2-octadecanone.

23. A method according to claim 1 wherein said nitroketone is 1-nitro-2-hexadecanone.

24. A method according to claim 1 wherein said nitroketone is 1-nitro-1-decanone.

25. A method according to claim 1 wherein said amide is 6-nitrohexanamide.

26. A method according to claim 1 wherein said amide is 12-nitrododecanamide.

27. A method according to claim 1 wherein said amide is heptadecanamide.

28. A method according to claim 1 wherein said amide is N-butylheptadecanamide.

29. A method according to claim 1 wherein said amid is N,N-diethylnonanamide.

30. A method according to claim 1 wherein said amide is N-heptadecanoylpiperidine.

* * * * *

UNITED STATES PATENT OFFICE
CERTIFICATE OF CORRECTION

PATENT NO. : 3,862,185
DATED : July 17, 1975
INVENTOR(S) : Richard F. Love and John M. Larkin It is certified that error appears in the above-identified patent and that said Letters Patent are hereby corrected as shown below:

Column 2, line 46    "When $R^3$ and" should read --When $R^3$ or--

Column 8, line 52    "6" should read --5--

Signed and Sealed this ninth Day of September 1975

[SEAL]

Attest:

RUTH C. MASON
*Attesting Officer*

C. MARSHALL DANN
*Commissioner of Patents and Trademarks*